Z. C. ROBBINS.
Carriage-Brake.
No. 4,569. Patented June 13, 1846.
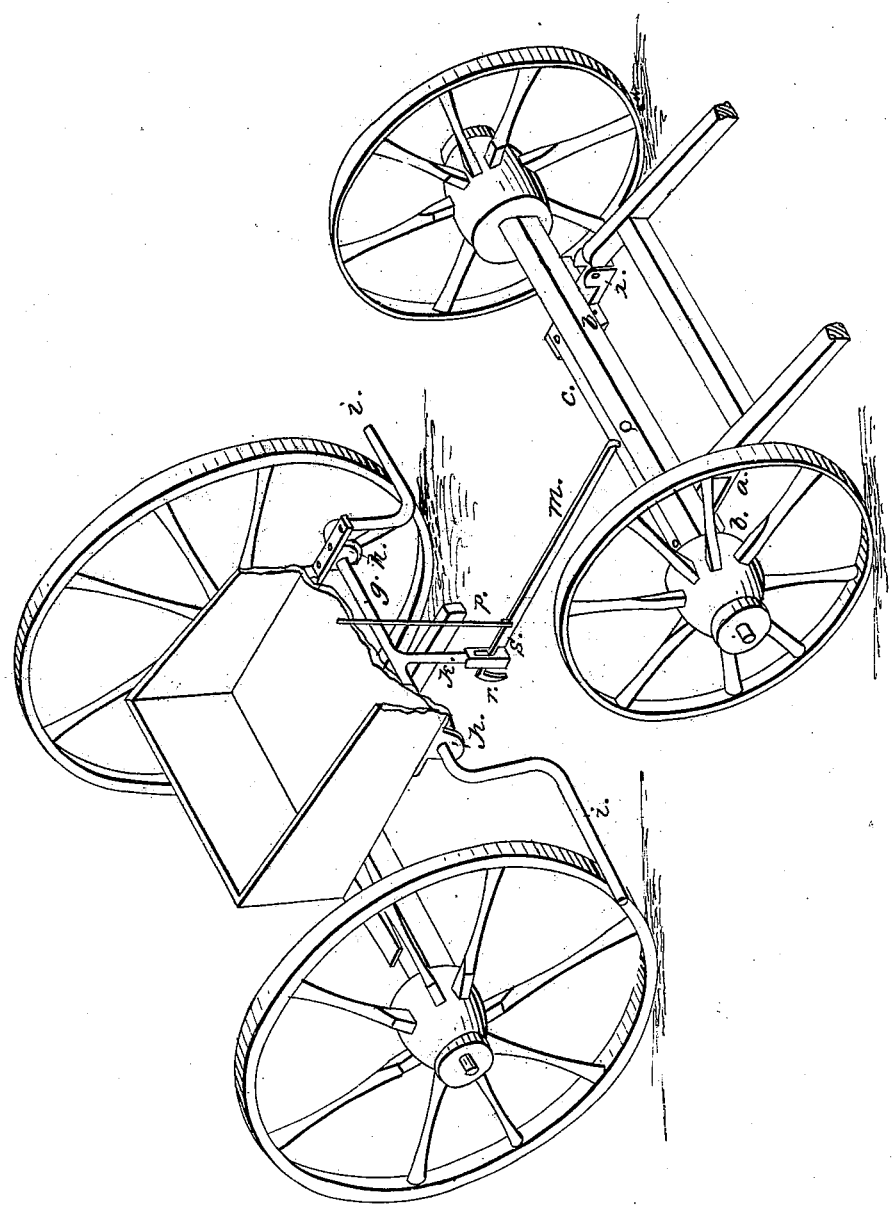

UNITED STATES PATENT OFFICE.

Z. C. ROBBINS, OF ST. LOUIS, MISSOURI.

SELF-ACTING BRAKE FOR CARRIAGES.

Specification of Letters Patent No. 4,569, dated June 13, 1846.

*To all whom it may concern:*

Be it known that I, ZENAS C. ROBBINS, of the city of St. Louis and State of Missouri, have invented a new and improved self-acting and self-adjusting carriage-brake for retarding the motion of carriages and other vehicles in descending inclinations; and I do hereby declare the following to be a full and exact description of the construction and operation of the same, reference being had to the accompanying drawings, making a part of this specification.

The nature of my invention consists in constructing a carriage brake in such a manner that when it is desired to back the carriage, the brake can easily be disconnected from the shafts of the same, and the rubbers prevented from acting on the wheels; and the moment the shafts are drawn forward, the brake resets itself in its proper position for acting upon the wheels at the first hill the carriage descends.

The accompanying drawing is a perspective elevation of a four wheeled vehicle, having my improved brake attached to it—a part of the body of the vehicle being removed, for the purpose of showing more clearly the construction and operation of the brake.

The rubbers $i$, $i$, of my improved brake may be constructed in any well known or usual manner. The rubbers $i$, $i$, are connected to levers descending from each end of a horizontal shaft $g$—passing transversely across under the center of the vehicle, secured in bearings $h$, $h$, bolted to the under side of the frame of the same. From the center of the shaft $g$, there descends a lever $k$, having a mortise or slot at its lower end. The draft shafts are connected to the brake shaft $g$, through the medium of a cross bar $c$, and a connecting rod $m$, in such a manner that when the horse presses back the draft shafts against the vehicle, for retarding its motion in descending an inclination, they force the rubbers $i$, $i$, on the brake shaft against the wheels—thereby checking the forward tendency of the vehicle—and aiding the horse in holding the same. The draft shafts are secured to sliding boxes $a$, $a$, which pass through mortises in the forward axle of a vehicle or are secured to the lower side of the axle by metallic caps $b$, $b$,—in such a manner as to give them free play, backward and forward. The rear end of the shaft boxes $a$, $a$, are made fast to the cross bar $c$, immediately in the rear of the forward axle. The cross bar $c$, is connected to the lever $k$, and brake shaft $g$, by the connecting rod $m$. The connecting rod $m$, is attached to the lever $k$, in such a manner that the brake shaft $g$, can be readily thrown out of connection with the draft shafts, when it is desired to back the vehicle; and to reset itself in connection with the brake shaft and rubbers, and the draft shafts, the instant that the shafts are drawn forward. The connecting rod $m$, passes through a mortise or slot in the lower end of the lever $k$; it has at its rear end a downward projection or hook $r$, and a short distance in front of the same, there is a shoulder $s$, when the recess between the shoulder $s$, and hook $r$, of the connecting rod is resting in the mortise at the lower end of the lever $k$, the draft shafts are in connection with the brake shaft and rubbers. When the shafts are forced back the shoulder $s$, on the connection rod $m$, presses against the bottom of the lever $k$, turning the brake shaft $g$, and forces the rubbers $i$, $i$, against the wheels; when the shafts are drawn forward again, the hook $r$, on the connecting rod $m$, strikes against the bottom of the lever $k$, and draws forward the same, at the same time drawing the rubbers from the wheels.

When it is desired to disconnect the draft shafts from the rubbers and brake shaft, for the purpose of preventing the rubbers from acting on the wheels in backing the vehicle; the driver has only to raise the rear end of the connecting rod $m$, which allows the shoulder $s$, to slide through the mortise in the lever $k$, and prevents its acting on the rubbers when the shafts are forced back; the instant the shafts are drawn forward again, the connecting rod $m$, drops into the recess between the shoulder $s$ and the hook $r$, and is in its proper connection with the rubbers and draft shafts to cause the self acting brake to act upon the wheels at the first inclination that is descended. The rear end of the connecting rod may be raised by a cord or rod $p$, carried up through the bottom of the vehicle, and placed in convenient proximity to the driver; and may be arranged in such a manner as to be operated by the hand or foot.

Having thus fully described my self act- ing and self adjusting carriage brake, what I claim as my invention and desire to secure by Letters Patent, is—

The combination of the draft shafts with the brake shaft (*g*,) by means of the connecting rod (*m*,) and lever (*k*,) so operating with each other that by lifting the rear end of the connecting rod (*m*,) the draft shafts can be forced back without acting on the brake shaft, and when the shafts are drawn forward again the connecting rod (*m*,) resets itself, making a perfect connection between the draft shafts and brake shaft, substantially as herein set forth.

ZENAS C. ROBBINS.

Witnesses:
HAZARD KNOWLS,
J. M. THAYER.